(12) United States Patent
Hübscher

(10) Patent No.: US 10,414,950 B2
(45) Date of Patent: Sep. 17, 2019

(54) SEMI-TRANSPARENT SEPARATING FILM FOR UV-SENSITIVE ADHESIVES

(71) Applicant: SIKA TECHNOLOGY AG, Baar (CH)

(72) Inventor: Peter Hübscher, Obernau (CH)

(73) Assignee: SIKA TECHNOLOGY AG, Baar (CH)

( * ) Notice: Subject to any disclaimer, the term of this patent is extended or adjusted under 35 U.S.C. 154(b) by 242 days.

(21) Appl. No.: 15/504,165

(22) PCT Filed: Aug. 24, 2015

(86) PCT No.: PCT/EP2015/069376
§ 371 (c)(1),
(2) Date: Feb. 15, 2017

(87) PCT Pub. No.: WO2016/030338
PCT Pub. Date: Mar. 3, 2016

(65) Prior Publication Data
US 2017/0253772 A1    Sep. 7, 2017

(30) Foreign Application Priority Data

Aug. 27, 2014 (EP) ..................................... 14182521

(51) Int. Cl.
| | |
|---|---|
| *B32B 27/32* | (2006.01) |
| *B32B 27/20* | (2006.01) |
| *B32B 7/12* | (2006.01) |
| *C09J 11/06* | (2006.01) |
| *C09J 11/04* | (2006.01) |
| *C08K 5/32* | (2006.01) |
| *C08K 3/22* | (2006.01) |
| *C09J 7/40* | (2018.01) |

(52) U.S. Cl.
CPC ................ *C09J 11/06* (2013.01); *B32B 7/12* (2013.01); *B32B 27/20* (2013.01); *B32B 27/32* (2013.01); *C09J 7/405* (2018.01); *C09J 11/04* (2013.01); *B32B 2307/73* (2013.01); *B32B 2309/105* (2013.01); *C08K 3/22* (2013.01); *C08K 5/32* (2013.01); *C08K 2003/2241* (2013.01); *C09J 2201/606* (2013.01); *C09J 2201/622* (2013.01); *C09J 2423/006* (2013.01); *C09J 2423/045* (2013.01); *C09J 2423/046* (2013.01); *C09J 2423/105* (2013.01)

(58) Field of Classification Search
None
See application file for complete search history.

(56) References Cited

U.S. PATENT DOCUMENTS

| | | | |
|---|---|---|---|
| 4,065,924 A | 1/1978 | Young | |
| 2011/0083765 A1* | 4/2011 | Stark | F16L 55/162 138/97 |

FOREIGN PATENT DOCUMENTS

| | | |
|---|---|---|
| DE | 102009041841 A1 | 7/2010 |
| EP | 0501239 A1 | 9/1992 |
| EP | 0810253 A2 | 12/1997 |
| EP | 1582555 A1 | 10/2005 |

OTHER PUBLICATIONS

Oct. 23, 2015 International Search Report issued in International Patent Application No. PCT/EP2015/069376.
Feb. 28, 2017 International Preliminary Report on Patentability issued in International Patent Application No. PCT/EP2015/069376.

* cited by examiner

Primary Examiner — Sheeba Ahmed
(74) Attorney, Agent, or Firm — Oliff PLC

(57) ABSTRACT

The invention relates to a separating film based on polyolefins or ethylene copolymers with a content of organic and optionally inorganic pigment and at least one UV stabilizer. The separating film has a transmission percentage between 5 and 20% in the range from 400 to 700 nm and a transmission percentage of <2% in the range from 300 to 500 nm. Such separating films have the advantage that marking regions applied onto membranes which can be found below the separating film remain detectable, and adhesives which can be found below the separating film are effectively protected from UV light and premature aging by the addition of inorganic and organic pigments and UV stabilizers. The invention further relates to composite structures of corresponding separating films and adhesives, to water-tight membranes with coatings made of adhesive and separating films, and to uses of corresponding membranes for sealing structures against water.

13 Claims, No Drawings

SEMI-TRANSPARENT SEPARATING FILM FOR UV-SENSITIVE ADHESIVES

TECHNICAL FIELD

The invention relates to a semitransparent release film for the protection of UV-sensitive pressure-sensitive adhesives, composite structures made of these release films coated with adhesives, waterproof membranes which have a coating made of an adhesive and of a corresponding release film, and also the use of these membranes for the sealing of buildings in respect of water.

PRIOR ART

In the construction sector it is usual to use waterproof membranes for the sealing of substrates in respect of water penetration. By way of example, U.S. Pat. No. 4,065,924 describes a protective layer in combination with an upper layer, where the protective layer is arranged on the substrate and the upper layer ensures bonding to the concrete that is applied, in that said layer is infiltrated by the concrete that is applied.

Waterproof membranes for the sealing of buildings are generally not manufactured in the size required for the final application, but instead are provided in the form of individual pieces of sheeting. Once these pieces of sheeting have been fixed to the buildings, they have to be bonded to one another in the regions where individual pieces of membrane sheeting overlap, in order to ensure complete sealing of the building in respect of water. This is achieved either via welding of the individual pieces of membrane sheeting to one another or with the aid of an adhesive, for example a pressure-sensitive adhesive. Although welding has the advantage that no adhesive is required for bonding of the individual membrane layers, the individual pieces of membrane sheeting have to be heated for welding and brought into contact with one another; this is time-consuming and requires the use of additional equipment. If the process is not carried out correctly, it is moreover possible that the membrane layers become damaged. These problems can be avoided when pressure-sensitive adhesives are used to bond individual pieces of membrane sheeting. This type of bonding can moreover be achieved very easily in that a release film (also termed release liner) optionally located on the pressure-sensitive-adhesive layer is peeled from the adhesive layer and the membrane is then pressed by way of the adhesive layer onto a second membrane layer arranged thereunder. Because the pressure-sensitive adhesive is applied on the membrane during production of the individual pieces of membrane sheeting, it can be ensured that the adhesive is present on the entire surface of the membrane area that requires adhesive bonding. It is thus possible, unlike in the case of a bond produced via welding, to avoid weld defects which permit penetration of water through the membrane layer.

However, a problem associated with pressure-sensitive adhesives used in a conventional manner is that these are generally sensitive to UV/visible radiation. UV-sensitivity here in particular means sensitivity to electromagnetic radiation of wavelength about 300 to 400 nm, as is present in solar radiation. Visible radiation means, in contrast, the wavelength range of about 400 to 700 nm. Some formulations of the adhesives described can also be sensitive to solar radiation in the range from 400 to 500 nm and can undergo chemical degradation; this leads to reduction, or failure, of pressure-sensitive-adhesive strength. It is therefore necessary that the pressure-sensitive-adhesive layer is protected from deactivating UV/visible radiation by use of a release film prior to adhesive bonding, or is used without any delay, in order to avoid prolonged exposure of the pressure-sensitive adhesive to radiation of that type. In particular on relatively large construction sites, however, use without any delay is often impossible, and pieces of membrane sheeting can therefore remain for up to three months in unrolled form before they are adhesive-bonded to one another. During this period, the adhesive layer is protected only by a release film, the design of which must therefore be such that it minimizes the quantity of deactivating UV/visible radiation reaching the pressure-sensitive adhesive.

Otherwise, photooxidative processes would deactivate the adhesive; this would lead to significantly reduced adhesive strength. This type of loss of adhesive strength is extremely disadvantageous because it significantly impairs adhesion and resistance to lateral migration after adhesive bonding.

The obvious solution to the problem of protection of sensitive pressure-sensitive adhesives in respect of deactivating UV/visible radiation therefore consists in use of release films that are impermeable to light. However, this has the disadvantage that users then cannot see any layout markings that may be on the membrane. These markings are necessary for longitudinal adhesive bonding, in order to ensure that adhesive bonding of the membrane is achieved uniformly over the entire length.

There have been previous descriptions of some semitransparent release films, but the protective effect of these in respect of deactivating UV/visible radiation is inadequate for practical use, and they have therefore not proven as successful in practical situations.

There is therefore a need for a release film which on the one hand provides a high level of protection in respect of deactivating UV/visible radiation over a prolonged period and on the other hand has adequate transmittance in the region of visible light, so that colored markings on a substrate are visible through the release film. The present invention proposes a solution for this problem.

DESCRIPTION OF THE INVENTION

It is accordingly an object of the present invention to improve the release films known from the prior art described above and to propose a release film which is highly effective in protecting an adhesive situated thereunder from UV and which at the same time has sufficient transmittance in the region of visible light, so that colored markings on a layer located under the adhesive layer remain discernible through the layers of the adhesive and the release film located above. This is achieved in the invention via a release film as claimed in claim 1.

The present invention moreover proposes composite structures with at least two layers, where the first layer is formed by a release film as described in claim 1 and the second layer is formed by an adhesive, and the two layers are in contact with one another. Finally, the present invention proposes waterproof membranes which have a coating with an adhesive and, on that side of the adhesive that is opposite to the waterproof membrane, a release film as described above. A final aspect of the present invention concerns uses of corresponding waterproof membranes.

The release film of the present invention is based on a polymeric material made of a polyolefin or ethylene copolymer. Suitable polyolefins are inter alia polypropylene, polyethylene, polymethylpentene, polyisobutylene, or poly-n-butylene. Suitable ethylene copolymers that can be used are especially ethylene-vinyl acetate (EVA), ethylene-vinyl alcohol (E/VAL), ethylene-butyl acrylate copolymers, ethylene-methyl acrylate copolymers, or ethylene-acrylic acid copolymers. Among the abovementioned, particular preference is given to polypropylene and/or polyethylene because of their good processing properties and their low costs. With respect to their properties, the polymers mentioned are not subject to any relevant restrictions, with the proviso that their strength should be adequate for a release film. The release film moreover comprises, alongside the main polymer(s), at least one organic pigment, and preferably also at least one inorganic pigment, and also at least one UV stabilizer. The release film is moreover characterized in that its transmittance in percent in the range from 500 to 700 nm is from 5 to 20%, and in the range from 300 to 500 nm is <2%, preferably <1% and particularly preferably <0.5%. The transmission values within these ranges are to be determined in each case with a UV/visible photospectrometer.

When transmittance in percent within a range is mentioned above, this means that the transmittance is to be within the stated limits throughout the entire range.

In a preferred embodiment, the transmittance in percent of the release film of the invention in the range from 500 to 700 nm is from 8 to 15%.

It has already been stated above that the release film is based on a polyolefin or ethylene copolymer. This implies that the polymer(s) constitute(s) the substantial constituent of the release film, i.e. preferably at least 60% by weight of the total weight of the release film, particularly preferably at least 80% by weight, and most preferably at least 85% by weight.

A particularly suitable composition of the release film of the invention can be described as follows:

100 parts of main polymer,
from 0.2 to 6 parts of organic pigment,
from 2 to 10 parts of inorganic pigment,
from 0.05 to 1 part of UV stabilizer, and
optionally from 0.05 to 10 parts of dispersing agent. The parts are based on mass.

While embodiments derived from these data theoretically include some that do not comply with the transmittance properties stated above, the person skilled in the art is readily capable of balancing the parts of the respective constituents with one another in a way that achieves compliance with the transmittance values prescribed within the stated ranges.

A particularly suitable inorganic pigment for the purposes of the present invention has proven to be titanium dioxide ($TiO_2$). Titanium dioxide absorbs UV light up to about 400 nm; in contrast, at higher wavelengths in the visible region and in the near infrared region titanium dioxide reflects light. A particularly preferred inorganic pigment is stabilized titanium dioxide.

However, titanium dioxide would not be sufficient as sole additional constituent of the release films of the invention to provide adequate protection of adhesives from aging due to UV light. The release films of the invention therefore comprise an organic pigment, preferably an organic pigment that absorbs visible light in the range from about 400 nm to about 550 nm. This means that on the one hand the absorption maximum of the organic pigment is to be in the range from 400 to 550 nm, and on the other hand absorption outside of said wavelength range is to be at most 30% of the maximal absorption. Organic pigments of this type are mostly yellow or orange. An example of a suitable organic pigment in this context is 3,3'-(1,4-phenylenediimino)bis(4,5,6,7-tetrachloro)-1H-isoindol-1-one, also known by the trade name Yellow 110.

Compliance with the transmission limits stated via claim 1 can also be achieved by using a combination of suitable organic pigments, instead of an inorganic pigment. However, this has the disadvantage that organic pigments, in contrast to inorganic pigments, can be degraded by exposure to sunlight. Relatively high content of organic pigments would moreover be necessary; this has attendant disadvantages because costs are higher than for inorganic pigments such as $TiO_2$. For the purposes of the present invention, it is therefore preferable that the release film comprises not only organic but also inorganic pigment.

Another necessary constituent of the release films of the invention is a UV stabilizer, which generally acts as free-radical scavenger and protects the matrix polymer (polypropylene and/or polyethylene) from premature aging and depolymerization. Examples that may be mentioned of suitable UV stabilizers are the known hindered-amine-based light stabilizers termed HALS (hindered amine light stabilizers), in particular in the form of light stabilizers based on sterically hindered N-alkoxyamines (also termed NOR HALS); other examples that may be mentioned are phosphites and sterically hindered phenols. Preference is given to a UV stabilizer selected from the list consisting of hindered amine light stabilizers (HALS), in particular in the form of hindered N-alkoxyamine light stabilizers, and to phosphites and sterically hindered phenols.

Examples of light stabilizers that can be used and that are based on hindered amines are inter alia the polymer of N,N'-bis(2,2,6,6-tetramethyl-4-piperidinyl)-1,6-hexanediamine (obtainable in the form of Chimassorb 2020 from BASF) or the polyamine with CAS No. 565450-39-7, marketed with trademark Tinuvin 371 by Ciba Specialty Chemicals. An example of a particularly suitable phosphite is tris(2,4-di-tert-butylphenyl) phosphite, obtainable with trademark Irgafos 168 from Ciba.

It is moreover possible that the release films of the invention include sterically hindered phenols, for example pentaerythritol tetrakis(3,5-di-tert-butyl-4-hydroxyhydrocinnamate) obtainable with trademark Irganox 1010 from BASF.

It is moreover possible to include a dispersing agent, for example in the form of calcium carbonate, in order to ensure greater homogeneity of distribution of pigments in the release film. A range of from 0.05 to 10% by weight can be stated as suitable proportion for this type of dispersing agent.

The cross section, or thickness, of the release film is generally in the range from 20 to 100 μm, preferably from 40 to 90 μm, and particularly preferably from 50 to 80 μm. The selected thickness depends on the one hand on the strength required from the material; on the other hand, the thickness should not be excessive, since this would lead to unnecessary use of materials and attendant increased costs. As mentioned, thickness is very particularly preferably in the range from 50 to 80 μm. On the one hand, this limits use of materials; on the other hand, within this range markings on a substrate are clearly visible.

It is moreover advantageous that at least one side of the release film of the invention has been siliconized. This can ensure that when the release film is in contact with an adhesive it can be peeled from the adhesive layer without excessive use of force and without leaving any residue. Siliconization properties are moreover preferably designed in such a way that, until the material is peeled from the adhesive layer, no deterioration of bond strength occurs for example during storage, transport, and construction-site use, and that the release film provides adequate protection from exterior effects such as rain, humidity, construction-site dust, and other environmental effects.

It is moreover preferable that the release film of the invention has an embossment or a crepe structure. By virtue of this it is also possible to use the release film in applications where a product (for example a waterproof membrane) coated with adhesive and release film is wound up on rolls. Wind-up on rolls compresses the release film against an adhesive applied thereunder. Because films can be stretched but not compressed, wind-up without embossment of the film would lead to formation of cannulas (i.e. regions where the release film is no longer in direct contact with an adhesive situated thereunder). This is avoided when the release film has an embossment or a crepe structure, since in this case the film can fold relatively easily in the manner of a concertina.

In a particularly preferred embodiment, the release film of the invention is a single-layer release film with a thickness range from 50 to 80 µm. It is moreover preferable that in this embodiment for every 100 parts of main polymer in the form of polypropylene and/or polyethylene there are from 2 to 10 parts of inorganic pigment present in the form of titanium dioxide, from 0.2 to 6 parts of organic pigment present, preferably 3,3'-(1,4-phenylenediimino)bis(4,5,6,7-tetrachloro)-1H-isoindol-1-one, from 0.05 to 1 part of UV stabilizer present, and optionally from 0.05 to 10 parts of dispersing agent present. In a very preferred embodiment, this embodiment has an embossment; this increases the number of possible applications.

Another embodiment of the present invention provides, as mentioned above, a composite structure with at least two layers, where a first layer is formed by a release film of the type described above and a second layer, in contact with the first layer, is formed by an adhesive. The adhesive is preferably a pressure-sensitive adhesive, in particular one based on a thermoplastic rubber.

Another embodiment of the present invention provides a waterproof membrane, characterized in that it has a coating with an adhesive, preferably a pressure-sensitive adhesive for example based on a thermoplastic rubber, and, on that side of the adhesive that is opposite to the waterproof membrane, has a release film of the type described above.

The material of the waterproof membrane can be composed of any of the materials described for this purpose in the prior art. Preference is given to a waterproof membrane made of thermoplastic olefins, in particular made of polypropylene (PP) or polyethylene (PE), or of polyvinyl chloride, or of flexibilized polyolefins (FPO). However, other materials can also be used for waterproof membranes, for example polyethylene terephthalate (PET), polystyrene (PS), polyamides (PA), ethylene/vinyl acetate copolymers (EVA), or chlorosulfonated polyethylenes.

A particularly preferred material for the waterproof membrane is a flexibilized polyolefin, for example in the form of a thermoplastic elastomer based on olefin (TPEO, TPO) or of an ethylene-propylene-diene rubber (EPDM), or a mixture thereof with ethylene-vinyl acetate or ethylene-butyl acrylate. Particularly suitable mixtures are mixtures of a thermoplastic elastomer based on an olefin with ethylene-vinyl acetate, and mixtures of polyethylene with ethylene-vinyl acetate or ethylene-butyl acrylate.

The thickness of the waterproof membrane can be from 0.05 to 2.5 mm, preferably from 0.50 mm to 2.0 mm, and in particular from 0.50 to 1.3 mm.

For the purposes of the present invention, the waterproof membrane moreover preferably has a coating made of adhesive and of the release film, not across the entire area of the membrane but instead only on a portion of the area thereof. It is particularly preferable that in the region of at least one of its edges the waterproof membrane has been coated with the adhesive and the release film, where adhesive and release film have advantageously been applied in the form of a strip, preferably of thickness from 5 to 15 cm, in particular about 10 cm.

It is moreover preferable that the waterproof membrane has marking regions which by virtue of their color are clearly distinguishable from the unmarked regions of the membrane. In this connection, it is particularly preferable that there is maximal color-contrast between the marking region and the unmarked regions of the membrane. This makes it easier for users to discern layout markings through the coating made of adhesive and release film, and thus ensures that correct longitudinal adhesive bonding of various pieces of film sheeting can be achieved. The absorption region of the color of the marking should moreover as far as possible not be similar to that of the organic pigment.

A final aspect of the present invention provides for the use of a waterproof membrane of the type described above for the sealing of buildings in respect of water ingress. The surface on which the membrane is applied is not of decisive importance here, i.e. the waterproof membrane can be used to seal a very wide variety of surfaces, for example concrete surfaces, wooden shuttering, or else pressure-resistant insulation materials. In a preferred embodiment of the use described above, a first membrane ply is bonded to a second membrane ply in that the release film is removed from the first membrane ply and in the region of adhesive application the membrane ply is placed over the second membrane ply and is adhesive-bonded thereto after activation of the adhesive. From what has been said above it is apparent that the first membrane ply is to be laid above the second membrane ply in such a way that the adhesive coating of the first membrane ply can be brought into contact with the second membrane ply. If the adhesive used comprises a pressure-sensitive adhesive, activation and adhesive bonding of the pressure-sensitive adhesive is achieved by pressing the upper membrane ply onto the lower membrane ply over the entire region of adhesive application.

The present invention is further described in more detail below with reference to some examples:

EXAMPLE

A release film was produced, based on a polypropylene matrix (100 parts), titanium dioxide (7 parts), 3 parts of the organic color pigment Yellow 110 and 0.3 part of an acid-resistant UV stabilizer based on a sterically hindered N-alkoxyamine (NOR HALS). The composition was extruded to give a film of thickness 60 µm, and siliconized on one side. A membrane of thickness 0.5 mm (made of a mixture of a thermoplastic elastomer based on olefin with ethylene-vinyl acetate) was then coated with a pressure-sensitive adhesive based on a thermoplastic rubber (SikaMelt® 9240); the release film described was then applied thereon.

The resultant test sample was irradiated for various periods with light from a high-pressure metal halide source with a power rating of about 910 W/m$^2$. Adhesive strength was then determined by means of FTIR (on the basis of changes in the signals of the carbonyl groups), finger test, and peeling of the experimental material from the test sample.

Without release film, it was found that the pressure-sensitive adhesive is deactivated after as little as about 5 to 10 hours of irradiation. From this it is possible to conclude that when used outdoors (latitude 50° N) the adhesive would not be useful for more than about 35 to 65 hours. In contrast, a pressure-sensitive adhesive protected by the release film of the invention revealed no change of adhesive strength even after 600 hours of irradiation.

This means that the adhesive would retain its full adhesive strength even after 3900 hours under actual environmental conditions.

Comparable results were found with a release film as specified above with thickness 80 μm and release films based on HDPE with thickness 60 μm.

A test for impermeability of the polypropylene membrane described above, thickness 60 μm, was carried out below to ASTM D5385, using a creped release film. The sample was clamped in an ASTM D5385 device for the test and water pressure was applied on the test area. The property thus tested was resistance to lateral migration over the area of the membrane (sample with prepunched hole) or the impermeability of an adhesive bond at an overlap. Each test comprised three pressure stages, with test pressure 1 bar for 4 hours in the first stage, test pressure 3 bar for 20 hours in the second stage and test pressure 5 bar for 6 days in the third stage. In the case of the membrane of the invention, the papers in the test apertures were found to be dry after conclusion of the test. Membrane-to-membrane adhesion was assessed as remaining good in this case; no lateral migration of water at the joint was observed, and no cannulas were observed.

What is claimed is:

1. A composite structure with at least two layers, where a first layer is formed by a release film and a second layer, in contact with the first layer, is formed by a pressure-sensitive adhesive,
   wherein the transmittance in % of the release film in the range from 500 to 700 nm is from 5 to 20%, and in the range from 300 to 500 nm is <2%, where the transmittance is to be determined in each case with a UV/visible photospectrometer,
   wherein the pressure-sensitive adhesive in the absence of the release film is susceptible to deactivation by the presence of UV radiation, and
   wherein the release film has one layer, its thickness is in the range from 50 to 80 μm, and for every 100 parts of main polymer in the form of polypropylene and/or polyethylene there are from 2 to 10 parts of inorganic pigment present in the form of titanium dioxide, from 0.2 to 6 parts of organic pigment present, and from 0.05 to 1 part of UV stabilizer present.

2. The composite structure as claimed in claim 1, wherein the transmittance in % of the release film in the range from 500 to 700 nm is from 8 to 15%.

3. The composite structure as claimed in claim 1, wherein the organic pigment absorbs visible light in the range from about 400 nm to about 550 nm.

4. The composite structure as claimed in claim 3, wherein the UV stabilizer is selected from the group consisting of hindered amine light stabilizers (HALS) in the form of hindered N-alkoxyamine light stabilizers, phosphites and sterically hindered phenols.

5. The composite structure as claimed in claim 1, wherein the pressure-sensitive adhesive is based on a thermoplastic rubber.

6. A structure comprising a waterproof membrane and composite structure as claimed in claim 5, wherein the pressure-sensitive adhesive contacts the waterproof membrane.

7. The structure as claimed in claim 6, wherein the pressure-sensitive adhesive contacts the waterproof membrane only in the region of at least one edge of the waterproof membrane.

8. The structure as claimed in claim 6, wherein the waterproof membrane has marking regions which by virtue of their color are clearly distinguishable from the unmarked regions of the membrane.

9. A method comprising removing the release film from the structure as claimed in claim 6 and then sealing a building against water ingress by bonding the waterproof membrane to the building after activation of the pressure-sensitive adhesive.

10. The method as claimed in claim 9, which is repeated multiple times, wherein with each repetition, the waterproof membrane overlaps a section of a previously applied waterproof membrane.

11. The composite structure as claimed in claim 1, wherein the release film has an embossment or a crepe structure.

12. The composite structure as claimed in claim 11, which has the ability to be wound up on rolls without formation of cannulas.

13. The composite structure as claimed in claim 3, wherein the organic pigment is 3,3'-(1,4-phenylenediimino)bis(4,5,6,7-tetrachloro)-1H-isoindol-1-one.

* * * * *